United States Patent [19]

Mayer

[11] Patent Number: 5,082,487
[45] Date of Patent: Jan. 21, 1992

[54] SOLUTIONS OF AMMONIUM SULFATE, AMMONIUM NITRATE AND UREA, WITH HIGH NITROGEN AND SULFUR CONTENT, HAVING LOW SALT-OUT TEMPERATURES

[75] Inventor: Richard E. Mayer, Richmond, Va.

[73] Assignee: Allied-Signal Inc., Morris Township, Morris County, N.J.

[21] Appl. No.: 179,820

[22] Filed: Apr. 11, 1988

[51] Int. Cl.$^5$ .................................................. C05C 9/00
[52] U.S. Cl. ............................................ 71/30; 71/64.1
[58] Field of Search ...................... 71/29, 30, 64.1, 59

[56] References Cited

U.S. PATENT DOCUMENTS 4,239,522 12/1980 Wilson et al. ................. 71/30 X

Primary Examiner—Ferris H. Lander
Attorney, Agent, or Firm—William H. Thrower

[57] ABSTRACT

Useful fertilizer solutions of high nitrogen and high sulfur content can be prepared from ammonium sulfate, ammonium nitrate and urea in water. By selecting proper ratios, low salt-out temperatures can be achieved to use optimum amounts of inexpensive urea.

4 Claims, 4 Drawing Sheets

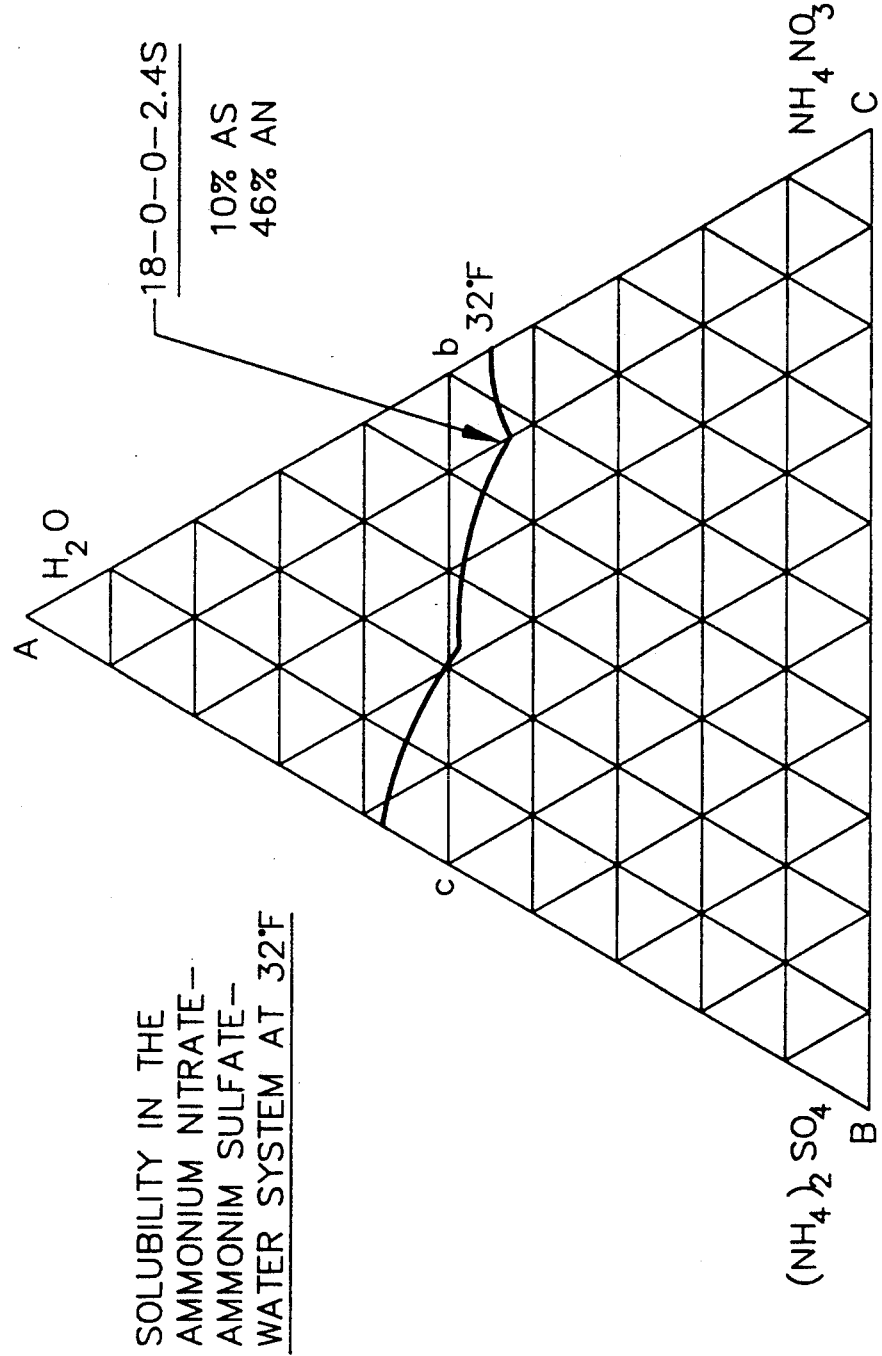

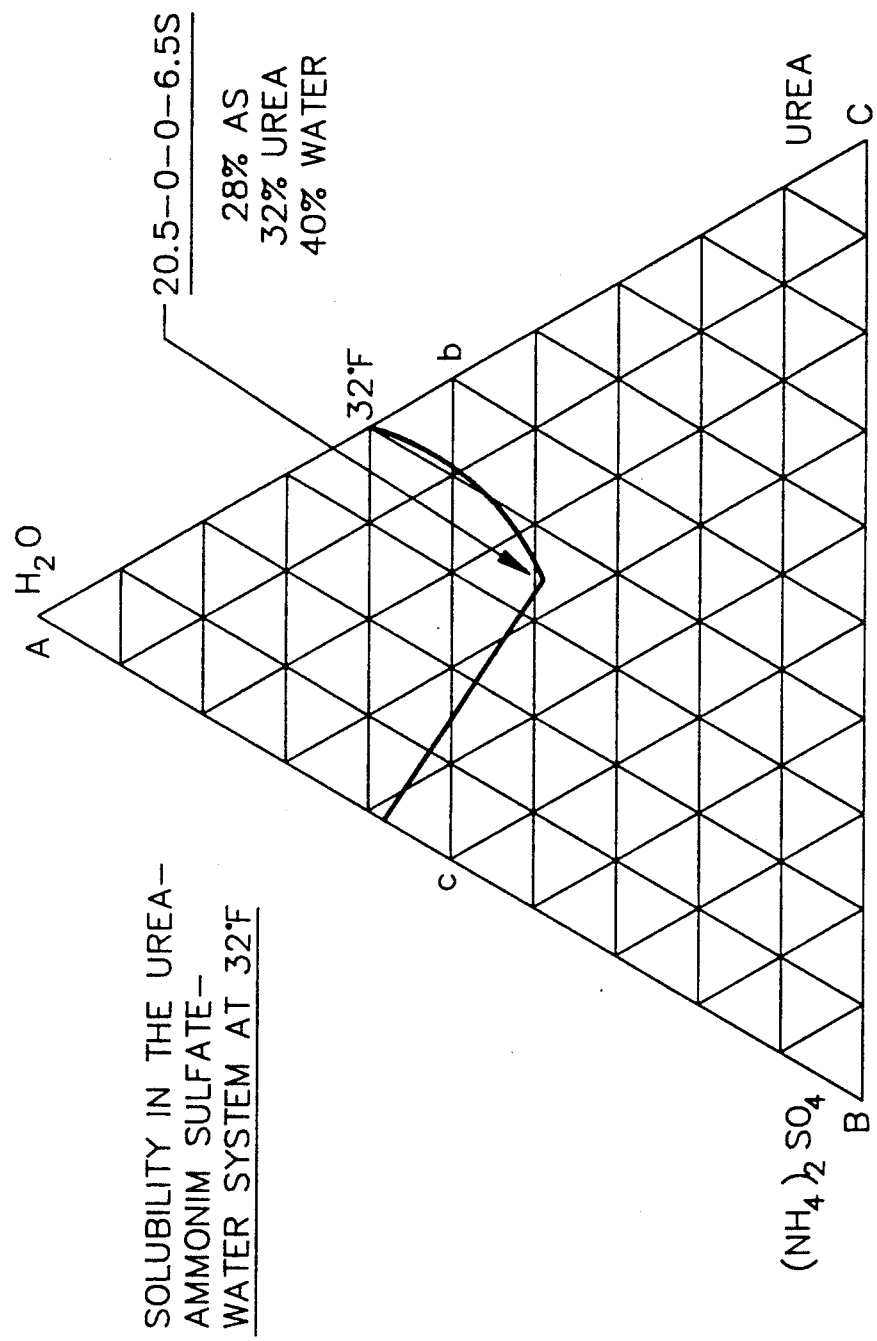

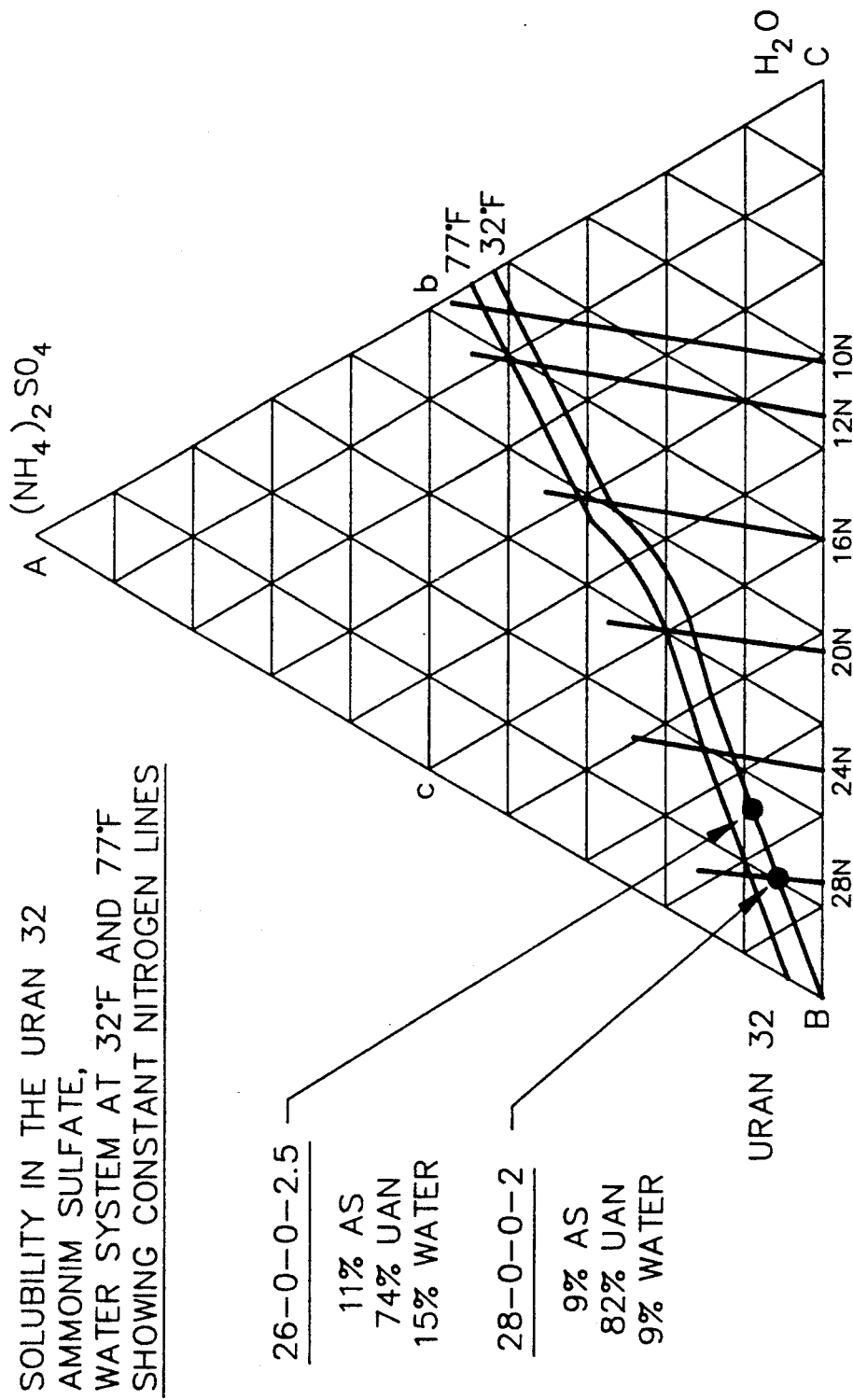

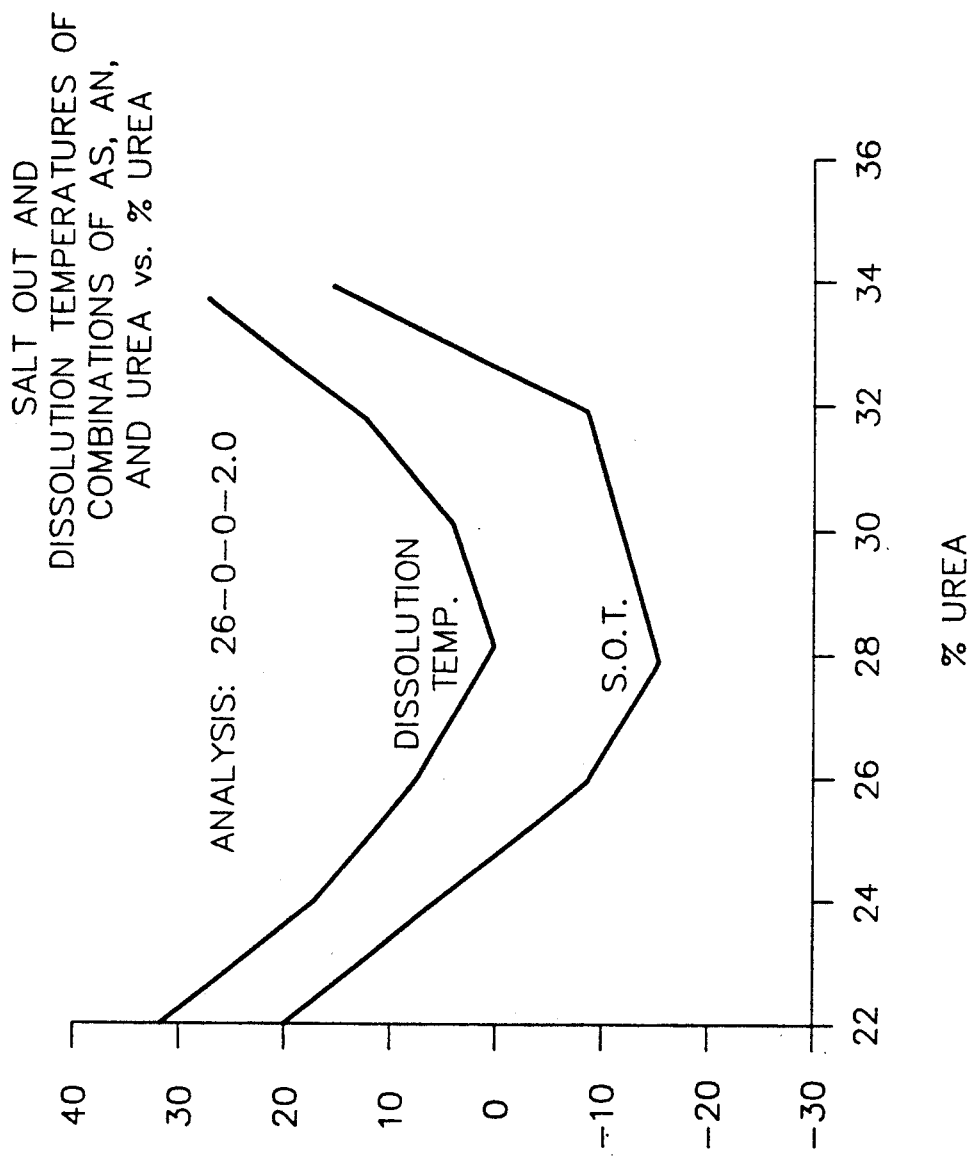

SOLUTIONS OF AMMONIUM SULFATE, AMMONIUM NITRATE AND UREA, WITH HIGH NITROGEN AND SULFUR CONTENT, HAVING LOW SALT-OUT TEMPERATURES

BACKGROUND OF THE INVENTION

This invention relates to liquid fertilizer, more specifically, solutions of ammonium sulfate, ammonium nitrate and urea in water which have a salt-out temperature below 32° F. (0° C.), yet have enhanced food value at an economical cost.

Urea-ammonium nitrate solutions (hereinafter sometimes UAN) have grown to dominate the nitrogen solutions market in the United States. Essentially three analyses have found favor. A given analysis will predominate in a geographical area because of compatibility of its salt-out temperature with regional temperature patterns. A 32 percent nitrogen UAN is dominant in the warmer South and Gulf Coast. The eastern region utilizes a 30 percent nitrogen UAN. In the colder corn belt and northern plains a 28 percent UAN is most common.

As seen in Table 1, all three analyses have a nominal 1.29 ammonium nitrate to urea (AN/U) weight ratio because, at any given salt-out temperature, this combination offers the highest solubility and highest nitrogen analysis. Approximately half of the nitrogen is derived from urea and the remainder from ammonium nitrate. The nitrogen content of these UAN solutions is far greater than can be practically obtained from either component alone.

In recent years considerable interest has developed in addition of other nutrients to nitrogen solutions, especially sulfur. Much of this sulfur has been supplied by ammonium thiosulfate (20-0-0-26S) (N-P-K-S). Ammonium thiosulfate can be mixed readily with UAN in the ratios normally desired. Even though it works well there is interest in other sources of sulfur for solutions for two reasons; 1. cost of sulfur in ammonium thiosulfate, and 2. only one-half of the sulfur is in sulfate form (desirable as plant food).

Ammonium sulfate overcomes these disadvantages, and the combination of it with urea, and ammonium nitrate is the subject of this invention.

The solubility diagram (FIG. 1) shows the combination of ammonium sulfate (AS) and ammonium nitrate (AN) which gives the highest percent solids at 32° F., contains 46 percent AN and 10 percent AS for an analysis of 18-0-0-2.4S. This level of plant food is too low to be useful.

When ammonium sulfate is used in combination with urea as shown in FIG. 2, it is possible to obtain a higher analysis of 20.5-0-0-6.5S with 32° F. (0° C.) salt-out temperature when AS is 28 percent and urea is 32 percent; but the ratio of N to S is too low and total plant food content is still lower than for any of the UAN solutions.

Solubility data exist for a UAN-ammonium sulfate system (FIG. 3). It is possible to prepare high nutrient content solution (28-0-0-2 and 26-0-0-2.5) with 32° F. (0° C.) salt-out temperatures from UAN 32 and ammonium sulfate. However, this salt-out temperature is not adequate for the colder regions. We therefore sought to find the combinations of urea, AN and AS which provide the lowest salt-out temperature for a given analysis.

Definitions

By salt-out temperature two tests are discussed herein. The conventional test simply notes the temperature at which crystals first form, ignoring any possible supercooling. The preferred test is determined by first forming crystals by cooling the solution, then determining the temperature at which the crystals redissolve. The temperature determined by the preferred test is also called the dissolution temperature herein.

When weight percent of elemental nitrogen (N) or sulfur (S) is given the atomic weight of the nitrogen or sulfur atom was used to calculate the percent.

SUMMARY OF THE INVENTION

This invention is a solution of ammonium sulfate, ammonium nitrate and urea in water useful as fertilizer which has a salt-out temperature at least below 32° F. (0° C.) as determined by forming crystals by cooling the solution, then determining the temperature at which the crystals redissolve. This solution contains at least about 24 percent by weight of elemental nitrogen, at least about 3 percent by weight of elemental sulfur, at least about 24 percent by weight of urea, at least about 15 percent by weight of ammonium nitrate, at least about 12.5 percent by weight of ammonium sulfate and the remainder water. The preferred solution contains urea in an amount between about 24 and 32 percent by weight, ammonium nitrate in an amount between about 15 and 30 percent by weight, and ammonium sulfate in an amount between about 12.5 and 14.6 percent by weight. The preferred solution can be one which has a salt-out temperature below 15° F. (−9.4° C.), with urea present in an amount of between about 25 and 29 percent by weight and elemental sulfur present in an amount of above about 3.5 percent by weight. More preferred is a solution which has a salt-out temperature which is below 5° F. (−15° C.) and urea is present in an amount between about 24 to 28 percent by weight with the sulfur still in an amount above 3 percent by weight.

In order to facilitate easy mixing and fast application of fertilizer in existing predominantly liquid spray equipment, the fertilizer retailer and/or applicator prefer using a liquid solution. Existing commercial UAN solutions can be enhanced by simply adding a solution of ammonium sulfate and urea to the existing solution. This saves the cost and trouble of dissolving a large quantity of solid fertilizer which is time consuming and can require heat and mechanical mixing means.

The preferred method of preparing a solution of ammonium sulfate, ammonium nitrate and urea in water comprises adding a mixture of urea with ammonium sulfate to an aqueous solution of 30.5 to 34.8 percent by weight of urea and 39.5 to 45.1 percent by weight of ammonium nitrate, so that a higher percent of urea solution is achieved and is possible by addition of urea alone. The preferred method uses a mixture of urea with ammonium sulfate as a solution. More preferred is the method wherein the UAN solution contains about 39.5 to 45.1 percent by weight of ammonium nitrate and 30.5 to 34.8 percent by weight urea and the mixture of additional urea with ammonium sulfate contains about 4.1 to 35.0 percent by weight urea and about 25.5 to 39.0 percent by weight ammonium sulfate. Another method of preparing the solution of ammonium nitrate, ammonium sulfate and urea in water comprises adding the dry ammonium nitrate, ammonium sulfate and urea in the proper proportions to water.

DESCRIPTION OF PREFERRED EMBODIMENT

It was discovered that lower ratios of AN/urea than in conventional UAN solutions often provide the lowest salt-out for a given analysis. For this reason they cannot be prepared from UAN and AS alone; but can be prepared from these two by providing additional urea. In the course of the studies it became clear that salt-out temperature measurements, i.e., lowering the temperature until crystals first appear, is not a good way to measure the minimum acceptable storage temperature. These solutions tend to "supercool" when the temperature is lowered and will actually slowly develop crystals on standing for long periods at temperatures of 5° to 10° F. (2.8° to 5.50° C.) higher than the recorded salt-out temperature. It is preferred to measure stability by dissolution temperature, the point at which all crystals dissolve on very slow heating. The differences between the salt-out and the dissolution temperatures can be seen in FIG. 4.

The other discovery was that certain of these AS-AN-U solutions are extremely sensitive to the percent urea in solution (the AN/U ratio).

Data for this composition and other of high nitrogen to sulfur content is shown in Table 2. Table 2 is comparative data, not part of this invention. Note there is a minima in the temperature versus composition curve of both similar to that in urea-ammonium sulfate-water system shown before. Also note it occurs slightly to the urea-rich side of the composition (1.29 AN/urea) which could be produced with UAN and AS alone. The 26-0-0-2S formulation has the same total plant food as UAN 28 and about the same "salt-out" characteristic when formulated to have 28 percent urea. When the sulfur content and total nutrient analysis are increased two things take place. The temperature increases and the temperature minima shifts to higher urea. Similar dissolution temperatures to that attainable with a UAN-AS system (1.29 AN/urea) can be achieved with a much richer urea system. (Compare 27 percent with 30 in the 26-0-0-2 system, and 26 percent with 28 percent in the 26-0-0-2.5 system.)

Most plant nutrition studies show that optimum yields are obtained when the N/S ratio is even lower. From Table 3 we see that a 24-0-0-3.0S with 26 percent urea can be stored at −4° F. (−20° C.) and has 50 percent of the nitrogen from normally cheaper urea and only 39 percent from the more expensive ammonium nitrate. A 1 percent nitrogen increase in nutrient to 25-0-0-3 increases temperatures by at least 9° F. (−12.8° C.) and shifts the lowest temperature to 28 percent urea from 26 percent. Note how rapidly the dissolution temperature rises as the urea content is reduced.

Even higher sulfur and total analysis are desirable for nutritional and economic considerations. These can be achieved at the 3.5 percent sulfur level. Solubility data for the 24-0-0-3.5S compositions in Table 4 indicate a solution with 26 percent urea exhibits a dissolution temperature of −1° F. (−18.3° C.) which makes it useful in almost any area of the United States. The remarkable similarity of both analyses in the 28 to 34 percent urea range is unexpected since the 25-0-0-3.5 has more total solids. It should be remembered that at any percent urea the difference is nitrate. The nitrate may help hinder crystallization as it does in UAN solutions.

EXAMPLE AND BEST MODE

A solution of ammonium sulfate and urea is prepared by dissolving with stirring and heating first the greater portion of a mixture of 28 parts of ammonium sulfate and 40 parts water. Then 32 parts urea and added and stirring and heating are continued until everything is dissolved. The solution resulting contains 20.5 percent nitrogen and 6.5 percent sulfur and has a dissolution temperature of 32° F. (0° C.). A commercially available UAN 32 solution (34.8 percent urea, 45.1 percent ammonium nitrate, 20.1 percent water), which has a 32° F. (0° C.) dissolution temperature, is diluted by adding with stirring 8.4 parts water to 45.4 parts of solution. To 53.8 parts of the diluted UAN solution is added with stirring 46.2 parts of the ammonium sulfate-urea solution. The solution which results contains 24 percent nitrogen and 3 percent sulfur and has a dissolution temperature of 18° F. (−7.8° C.).

Prior Art

TABLE 1

| Prior Art COMPOSITION AND PROPERTIES OF TYPICAL UAN FERTILIZER SOLUTIONS | | | |
|---|---|---|---|
| | Nitrogen, % | | |
| | 28 | 30 | 32 |
| Ammonium Nitrate, % | 39.5 | 42.2 | 45.1 |
| Urea, % | 30.5 | 32.7 | 34.8 |
| Water, % | 30.0 | 25.1 | 20.1 |
| Ammonium Nitrate/Urea | 1.29 | 1.29 | 1.29 |
| Nitrate Nitrogen, % | 6.91 | 7.39 | 7.89 |
| Ammoniacal Nitrogen, % | 6.91 | 7.89 | 7.89 |
| Urea Nitrogen, % | 14.23 | 15.25 | 16.22 |
| Salt-Out Temperature, | | | |
| °F.* | 1 | 15 | 31 |
| °C. | −17.2 | −9.4 | −0.56 |

*The approximate temperature at which crystals being to form.

TABLE 2

| DISSOLUTION TEMPERATURES COMPARATIVE FOR COMBINATIONS OF AS, AN AND UREA WHICH HAVE HIGH NITROGEN TO SULFUR RATIOS | | | | | | |
|---|---|---|---|---|---|---|
| Urea, % | 26-0-0-2.0 S (N/S = 13) AN/Urea | Dissolution Temperature, °F. | °C. | 26-0-0-2.5 S (N/S = 10) AN/Urea | Dissolution Temperature, °F. | °C. |
| 22 | 1.83 | 32 | 0 | — | — | — |
| 24 | 1.57 | 19 | −7.2 | 1.30 | 41 | 5 |
| 26 | 1.35 | 9 | −12.8 | 1.30 | 14 | −10 |
| 27 | — | — | — | 1.21 | 9 | −12.8 |
| 28 | 1.16 | 0 | −17.8 | 1.11 | 12 | −11.1 |
| 30 | 0.99 | 5 | −15 | 0.95 | 19 | −7.2 |
| 32 | 0.85 | 12 | −11.1 | 0.81 | 23 | −5 |
| 34 | 0.72 | 28 | −2.2 | 0.69 | 32 | 0 |
| 36 | — | — | — | 0.57 | 37 | 2.8 |

TABLE 3

| DISSOLUTION TEMPERATURES FOR COMBINATIONS OF AS, AN AND UREA WITH MEDIUM NITROGEN TO SULFUR RATIOS | | | | | | |
|---|---|---|---|---|---|---|
| Urea, % | 24-0-0-3.0 S (N/S = 8.0) AN/Urea | Dissolution Temperature, °F. | °C. | 25-0-0-3.0 S (N/S = 8.3) AN/Urea | Dissolution Temperature, °F. | °C. |
| 22 | 1.47 | 25 | −3.9 | 1.59 | 118 | 48 |

TABLE 3-continued
DISSOLUTION TEMPERATURES FOR COMBINATIONS OF AS, AN AND UREA WITH MEDIUM NITROGEN TO SULFUR RATIOS

| Urea, % | 24-0-0-3.0 S (N/S = 8.0) AN/Urea | Dissolution Temperature, °F. | °C. | 25-0-0-3.0 S (N/S = 8.3) AN/Urea | Dissolution Temperature, °F. | °C. |
|---|---|---|---|---|---|---|
| 24 | 1.23 | 7 | −13.9 | 1.35 | 28 | −2.2 |
| 26 | 1.03 | −4 | −20 | 1.15 | 18 | −7.8 |
| 28 | 0.87 | 3 | −16.1 | 0.97 | 5 | −15 |
| 30 | 0.72 | 14 | −10 | 0.82 | 18 | −7.8 |
| 32 | 0.61 | 21 | −6.1 | 0.68 | 27 | −2.8 |
| 34 | — | — | — | 0.43 | 27 | −2.8 |
| 36 | — | — | — | 0.35 | 41 | 5 |

TABLE 4
DISSOLUTION TEMPERATURES FOR COMBINATIONS OF AS, AN AND UREA WHICH HAVE LOWER NITROGEN TO SULFUR RATIOS

| Urea, % | 24-0-0-3.5 S (N/S = 6.8) AN/Urea | Dissolution Temperature, °F. | °C. | 25-0-0-3.5 S (N/S = 7.1) AN/Urea | Dissolution Temperature, °F. | °C. |
|---|---|---|---|---|---|---|
| 24 | 1.23 | 21 | −6.1 | — | — | — |
| 26 | 1.03 | −1 | −18.3 | — | — | — |
| 27 | 0.90 | 5 | −15 | 1.00 | 118 | 48 |
| 28 | 0.87 | 11 | −11.7 | 0.92 | 12 | −11.1 |
| 30 | 0.72 | 19 | −7.2 | 0.77 | 21 | −6.1 |
| 32 | 0.56 | 26 | −3.3 | 0.64 | 28 | −2.2 |
| 34 | 0.44 | 33 | 0.5 | 0.52 | 35 | 1.7 |

What is claimed:

1. The method to achieve a lower salt-out temperature than at nominal 1.29 ammonium nitrate to urea weight ratios, with enhanced food value at an economical cost for liquid fertilizer comprising water, urea, ammonium sulfate and ammonium nitrate, said method consisting of preparing a solution of said urea, ammonium sulfate and ammonium nitrate in water using a maximum possible weight percent urea of between about 24 and 30%, a nitrogen to sulfur ratio of between about 8.3 and 6.8 and an ammonium nitrate to urea ratio of between about 1.23 and 0.72 and within and between the following relationships,

| urea wt. % | ratio of nitrogen to sulfur | ratio of ammonium nitrate to urea |
|---|---|---|
| 26–30 | 8.3 | 0.82 to 1.15 |
| 24–30 | 8 | 0.72 to 1.23 |
| 28–30 | 7.1 | 0.77 to 0.92 |
| 24–30 | 6.8 | 0.72 to 1.23 | so that the resulting salt-out temperature is between about −4° to 25° F. (−20° to −6° C.).

2. A solution of ammonium sulfate ammonium nitrate and urea in water prepared by the method of claim 1 useful as fertilizer which has a salt-out temperature at least below 32° F. (0° C.) as determined by forming crystals by cooling the solution, then determining the temperature at which the crystals redissolve, said solution containing at least about 24 percent by weight of elemental nitrogen, at least about 3 percent by weight of elemental sulfur, at least about 24 percent by weight of urea, at least about 15 percent by weight of ammonium nitrate, at least about 12.5 percent by weight of ammonium sulfate and the remainder water.

3. The solution of claim 2 wherein the salt-out temperature is below 15° F. (−9.4° C.), urea is present in an amount of between about 25 and 29 percent by weight and elemental sulfur is present in an amount of above about 3.5 percent by weight.

4. The solution of claim 2 wherein the salt-out temperature is below 5° F. (−15° C.) and urea is present in an amount between about 24 to 28 percent by weight.

* * * * *